(12) United States Patent
Dupont et al.

(10) Patent No.: US 6,877,527 B2
(45) Date of Patent: Apr. 12, 2005

(54) ARRANGEMENT FOR CONNECTING AND DISCONNECTING TWO PIPE SECTIONS OF A FLUID TRANSFER SYSTEM

(75) Inventors: Bernard Dupont, Eaubonne (FR); Stéphane Paquet, Paris (FR); René Lauhle, Villenave d'Ornon (FR); Jean-Claude Garrigues, Cadaujac (FR)

(73) Assignees: Societe Europeenne d'Ingenierie Mecanique-Eurodim, Rueil Malmaison (FR); KSB S.A., Gennevilliers (FR)

( * ) Notice: Subject to any disclaimer, the term of this patent is extended or adjusted under 35 U.S.C. 154(b) by 0 days.

(21) Appl. No.: 10/481,135

(22) PCT Filed: Jul. 2, 2002

(86) PCT No.: PCT/FR02/02304

§ 371 (c)(1),
(2), (4) Date: Jul. 22, 2004

(87) PCT Pub. No.: WO03/004925

PCT Pub. Date: Jan. 16, 2003

(65) Prior Publication Data

US 2004/0244846 A1 Dec. 9, 2004

(30) Foreign Application Priority Data

Jul. 3, 2001 (FR) .............................................. 01 08815

(51) Int. Cl.⁷ .............................................. F16L 29/00
(52) U.S. Cl. .............................................. 137/614.01
(58) Field of Search .......................... 137/614.01, 614, 137/614.02; 251/305

(56) References Cited

U.S. PATENT DOCUMENTS

| 2,333,496 | A | * | 11/1943 | Townhall et al. | ...... 137/614.01 |
| 4,037,819 | A | * | 7/1977 | Kindersley | .................. 251/306 |
| 4,436,281 | A | * | 3/1984 | Chiron | ........................ 251/305 |
| 4,601,459 | A | * | 7/1986 | Verdelet | ...................... 251/306 |
| 4,667,883 | A | * | 5/1987 | Fink, Jr. | ...................... 137/614 |
| 5,095,946 | A | * | 3/1992 | McLennan | ............. 137/614.01 |
| 6,269,836 | B1 | * | 8/2001 | Monti et al. | ........... 137/614.02 |

FOREIGN PATENT DOCUMENTS

| EP | 080 136 | 6/1983 |
| EP | 096 209 | 12/1983 |
| FR | 2 572 786 | 5/1986 |

\* cited by examiner

Primary Examiner—Kevin Lee
(74) Attorney, Agent, or Firm—Leydig, Voit & Mayer, Ltd.

(57) ABSTRACT

An arrangement for connecting and disconnecting two pipe sections in a fluid transfer system. Each section includes a butterfly valve with a disk pivotally mounted inside, rotating about a swivel axis between a closed position closing the cross-section of the fluid flow and an open position opening the cross-section of the fluid flow. The swivel axes extend perpendicular to the pipe axis and parallel to each other. The swivel axes of the disks are eccentric relative to the axes of the sections to reduce the space between the disks in their closed position, when the sections are connected. The invention is useful for transferring liquefied natural gas.

10 Claims, 4 Drawing Sheets

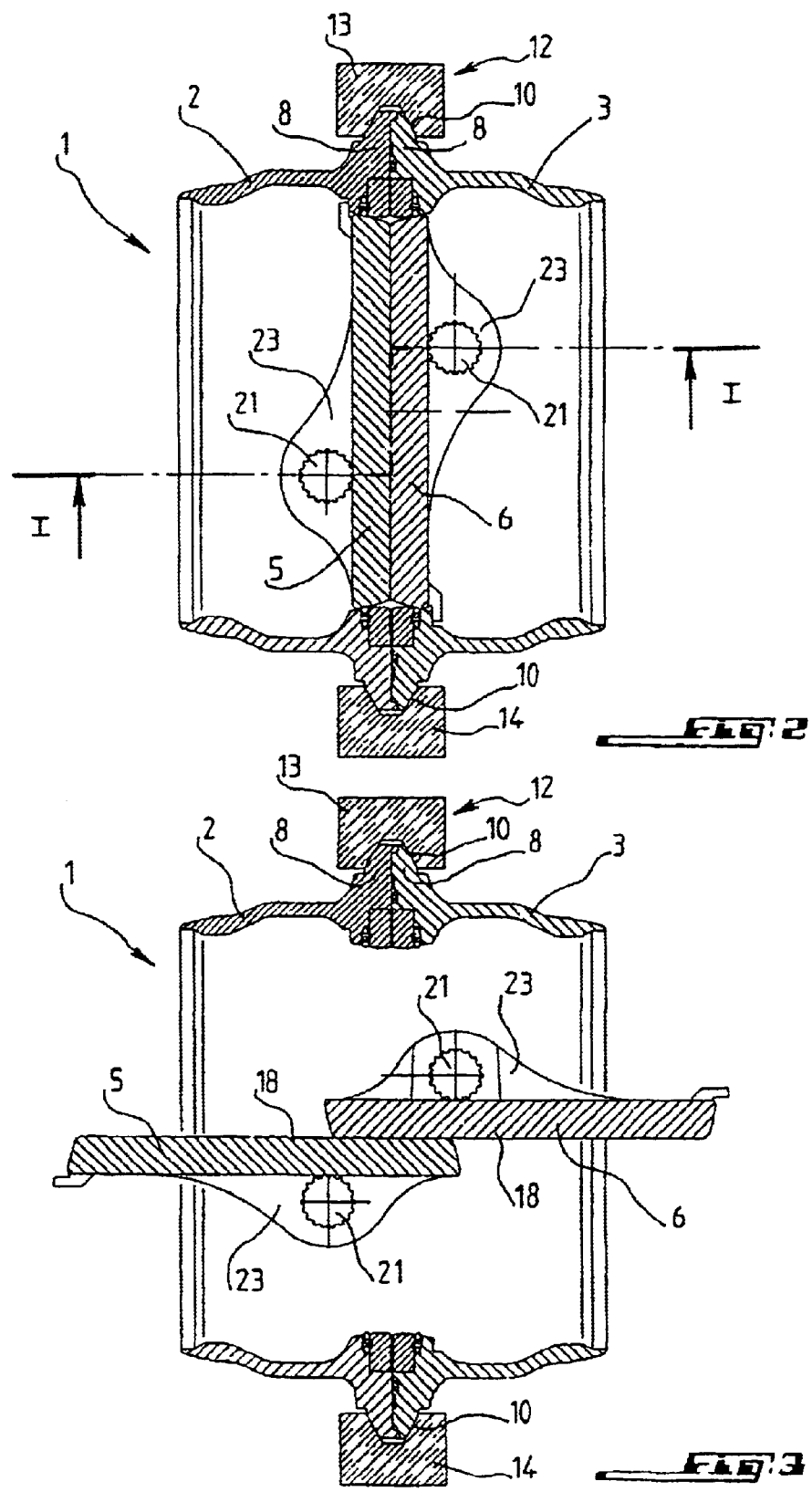

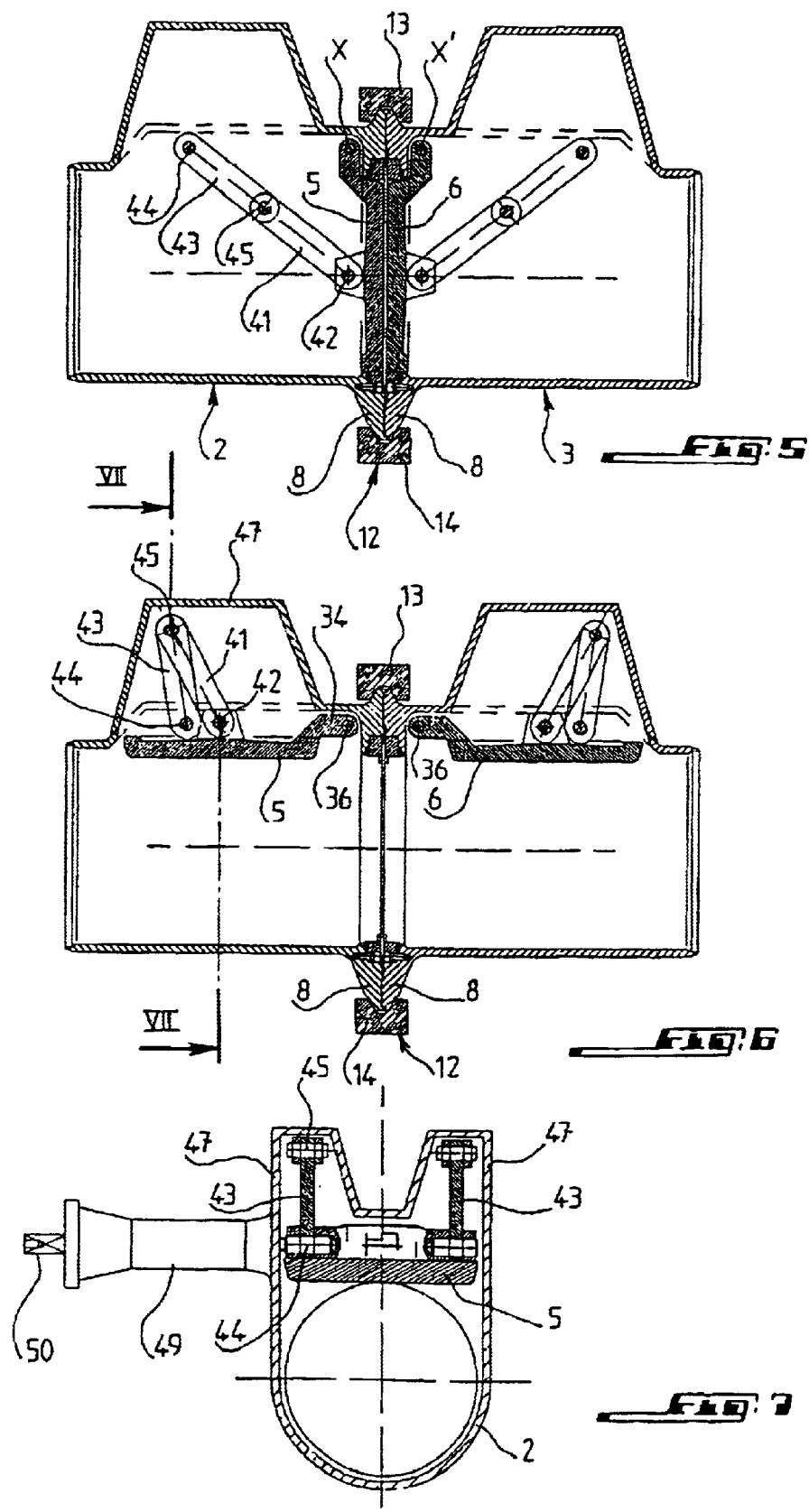

ARRANGEMENT FOR CONNECTING AND DISCONNECTING TWO PIPE SECTIONS OF A FLUID TRANSFER SYSTEM

FIELD OF THE INVENTION

The invention relates to an arrangement for connection and disconnection of two pipe sections of a fluid transfer system, each constituting the end element of a pipeline and being configured in the form of a butterfly valve provided with a disk mounted so as to pivot inside the pipe section around a pivot axis between a position closing the cross section of the fluid flow and a position opening of the latter, and an exterior device for control of the pivoting, the pivot axes extending perpendicular to the axis of the pipe and parallel to one another.

BACKGROUND OF THE INVENTION

Connection arrangements are already known and make it possible to connect together respective pipelines for supplying and receiving a fluid in one direction or the other, between two stations, one of which could be a fixed station and the other of which could be a mobile station.

Also known in the known connection and disconnection arrangements is an emergency disconnection device making it possible, in an extreme situation of drift or accident, for example, in case of fire, to distance the mobile pipe section from the fixed pipe section in order to prevent damage to the structure or wrenching off of the pipes while ensuring containment of the fluid in the pipelines.

In the known arrangements, the pivot axes of the disks of the two pipe sections are spaced apart from one another, in the axial direction of the pipe sections, when the pipe sections are connected, thus enabling execution of their pivoting movement between open and closed positions. This has the disadvantage that when the disks occupy their closed position they delimit between them a relatively large space that is filled with fluid. In event of emergency disconnection, this quantity of fluid is lost into to the environment.

Such an incident is very serious when the transferred fluids are dangerous to people and the environment, or involve a risk of fire. This is the case in particular for the transfer of liquefied natural gas (LNG) between, for example, a loading or unloading terminal and a liquefied gas tanker.

SUMMARY OF THE INVENTION

The present invention aims to propose a connection and disconnection arrangement of the type defined above, but which no longer has the major disadvantage just stated.

In order to attain this aim, in the connection and disconnection arrangement according to the invention, the pivot axes of the disks are arranged off center, with respect to the axis of the pipe sections, to reduce the space between the disks in their closed position when the pipe sections are pipe connected.

According to one feature of the invention, the pivot axes are offset pependicular to the axis of the pipe sections, symmetrically with respect to this axis.

According to yet another feature of the invention, the spacing between the two disks is approximately zero when they occupy their closed position.

According to yet another feature of the invention, the aforementioned two disks butt against one another in their open position in order to cancel out kinematic play and therefore any vibrations or flutter of the disks that may be induced by instabilities of the fluid flow.

According to yet another feature of the invention, the pivot axis of a disk is formed by a shaft fixed by mounting on the rear surface of the disk.

According to yet another feature of the invention, the pivot axis of a disk is arranged outside of the cross section of the fluid flow of the pipe section in which the disk is pivotably mounted.

According to yet another feauture of the invention, a tab is attached at the periphery of a disk, and the pivot axis is located at a free end of this tab.

According to yet another feature of the invention, a device with articulated arms is associated with a disk in order to ensure its pivoting, the free end of one of the arms being articulated to the disk, while the free end of the other arm is articulated to the wall of the pipe section.

BRIEF DESCRIPTION OF THE DRAWINGS

The invention will be better understood, and other aims, characteristics, details and advantages of it will appear more clearly in the following explanatory description with reference to the appended diagrammatic drawings, given only as an example, illustrating two embodiments of the invention in which:

FIG. 2 is a view in section of the arrangement according to FIG. 1, in the direction of line II—II of FIG. 1, and shows the arrangement in the closed position of the disks;

FIG. 3 is a view similar to FIG. 2 and shows the disks in their open position;

FIG. 5 is a view in axial section of another embodiment of an arrangement according to the invention and illustrates the disks in their closed position;

FIG. 6 is a view similar to FIG. 5 and shows the disks in their open position; and FIG. 7 is a view in section along line VII—VII of FIG. 6.

DETAILED DESCRIPTION OF THE PREFERRED EMBODIMENT

FIGS. 1 to 4 show a first embodiment of an arrangement for connection and disconnection of two end sections of pipelines which are to be connected, of a system for transfer of fluid 1 such as liquefied natural gas, between two stations. One of the stations could be a liquefied gas tanker and the other a loading or unloading terminal.

The figures show only the connection and disconnection arrangement, which bears general reference 1 and includes the two pipe sections 2, 3 respectively mounted at the ends of the pipelines of the two stations mentioned above. Each section is produced in the form of a butterfly valve, and has circular disk 5, 6 which is mounted inside the pipe section, for which the fluid flow cross section is consequently circular.

Figure 1:
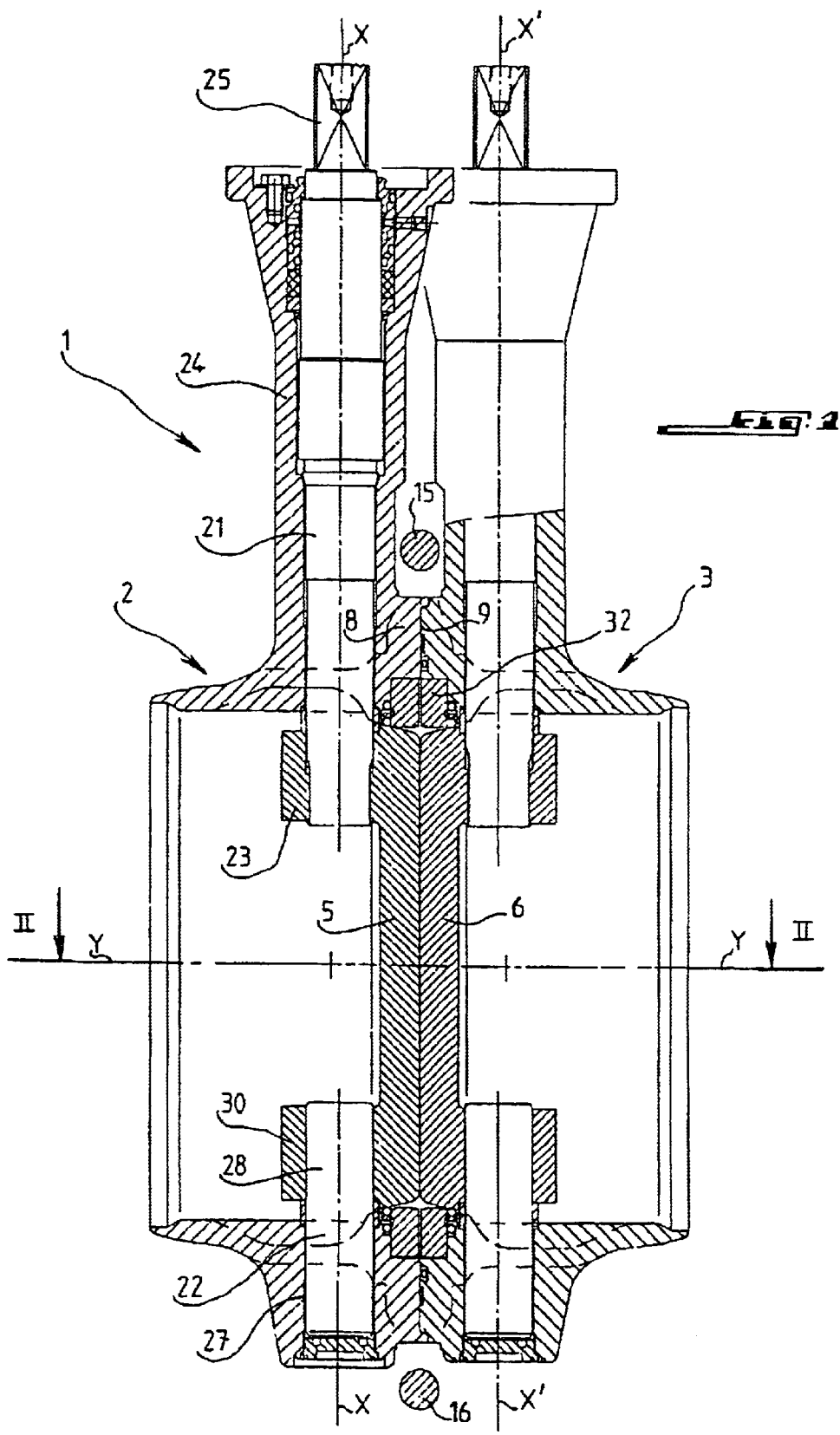
FIG. 1 is a view in axial section of a connection and disconnection arrangement according to the invention, along line I—I of FIG. 2, the disconnection device only being represented diagrammatically.

Each disk 5 and 6 is mounted so as to pivot inside of section 2, 3 with which it is associated, respectively around an axis X, X' between a position of closing the fluid flow cross section, shown in FIGS. 1 and 2, and a position of opening this cross section, illustrated in FIG. 3.

Each pipe section or valve 2, 3 has a general cylindrical shape and is provided, at its end adjacent to the other pipe section, with annular collar 8 giving the pipe section a flat front surface 9. The peripheral surface of the two collars is configured in such a way that, in the state of connection of the two pipe sections 2 and 3, which are then axially aligned, they form an assembly with an exterior truncated conical contour 10 that is intended for being engaged in a groove with a complementary V shape of an emergency disconnection device, indicated diagrammatically by a ring 12 in FIGS. 2 and 3. This emergency disconnection device is known and described in the French Patent No. 2 580 367. Given that it is not part of the invention, it will not be described in more detail. It is sufficient to indicate, for the sake of understanding the invention, that ring 12 is composed, for example, of two ring segments 13, 14 which, when the pipe sections are connected, ensure the immobilization of the two sections in their connected position as shown in FIG. 2, and which can be separated, in the manner indicated in FIG. 4 by arrows, in the event of emergency disconnection, thus releasing collars 8 of the two pipe sections, making it possible to separate them, as seen also in FIG. 4.

It should be noted that the two ring segments 13, 14 remain connected to pipe section 3. For more details concerning the disconnection device, one should refer to French Patent No. 2 580 367. It should also be noted that this emergency disconnection device is represented in FIG. 1 only by the two circular elements 15 and 16 for assembling the two ring segments 13 and 14.

According to an essential characteristic of the invention, exterior front surface 18 of each disk 5, 6, in closed position, is aligned with flat peripheral surface 9 of collar 8 of its pipe section, so that the two surfaces 18 are in contact with one another when the two pipe sections 2 and 3 are connected.

The ability of disks 5 and 6 to pivot from this closed position into their open position represented in FIG. 3 is ensured by appropriate arrangements of their pivot axes.

According to another important characteristic of the invention the two disks butt against one another in the open position. This arrangement makes it possible to arrest the kinematic play and prevent any vibration or flutter of the disks that may be induced by instabilities in the fluid flow.

In order to produce the two features, axis X of disk 5 and axis X' of disk 6 are offset from one another in the direction of axis Y—Y of the pipe sections, on the one hand, and are symmetrically off-center with respect to this axis Y—Y, on the other hand. The differences are roughly the same in both cases. The two disks are thus in contact with one another in their closed position, and can both pivot around their axes in a synchronous manner in order to reach the open position represented in FIG. 3 in which the two disks are oriented parallel to axis Y—Y of the pipe sections while still being in contact on a portion of their surface. Each disk has therefore executed a pivoting movement of a quarter of a turn.

The pivot axis of each disk is materialized by operating shaft 21 and shaft stub 22 which are axially aligned. Shaft 21 is rotationally fixedly connected in securing tab 23 situated high near the periphery of the disk, projecting from the rear surface of it, and is rotatably mounted in exterior tubular end piece 24 of the pipe section. Free exterior end 25 of this shaft is configured so that it can be put in rotation. Shaft end 22 is installed by one end at 27 in the body of the pipe section and its end 28 is received, in such a way as to rotate freely, in tab 30 provided on the rear surface of the disk near its periphery, low down.

It should be noted that a section carries, on its flat front surface 9, annular gasket 32 which is arranged in an appropriate annular recess. This gasket can be metallic, plastic, or made of a composite material.

Figure 4:
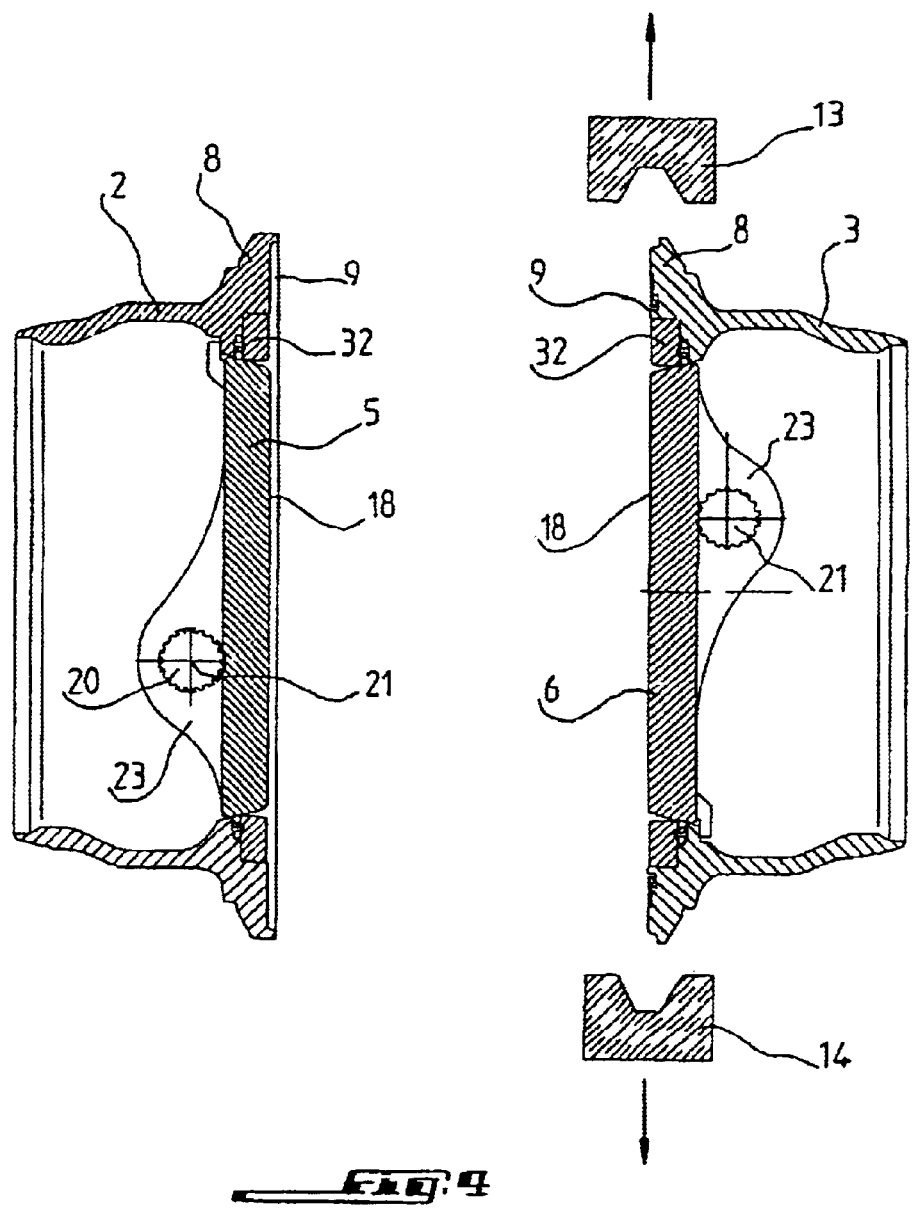
FIG. 4 is a view of the arrangement according to FIG. 2 after emergency disconnection.

FIGS. 1 to 3 represent module 1 in a connected state from engagement of collars 8 by their truncated conical peripheral surface in the V-shaped groove of ring 12 of the emergency disconnection device. FIG. 4 shows the two pipe sections 2 and 3 after an emergency disconnection. It is observed, as indicated above, that this disconnection occurs by opening of ring 12, that is to say by radial movement of the two ring segments 13 and 14 outward.

FIGS. 5 to 7 show a second embodiment of connection and disconnection module 1 according to the invention. In this embodiment, the pivot axes of disks 5 and 6 are situated outside of the fluid flow cross section of sections 2 and 3. For this purpose, tab 34, which extends towards the exterior, is provided at the periphery of disks 5 and 6, on their rear surface. Installed in the other, free end of this tab is rotating shaft 36 whose axis constitutes the pivot axis of the disk.

Each disk is operated through two articulated arms, namely first arm 41, which is articulated at 42 on the rear surface of the disk, and second arm 43, which is articulated at its free end at 44 to the body of the pipe section. The shafts are articulated to one another at 45. The axes of articulation of the arms of course extend parallel to the pivot axis of the disk. As shown by the figures, in order to allow folding of arms 41 and 43 during pivoting of the disk in its open position, represented in FIG. 6, the pipe section is provided with lateral protuberance 47 which makes it possible to receive the two arms then folded on one another.

For the operation of its disk, for opening and for closing 5 or 6, each section is provided with tubular end piece 49 for passage of the operating shaft, whose exterior control end is represented at 50. The shaft acts on arm 43 at the location of its articulation 44 on the rear face.

It should also be noted that in the closed position of the disk, articulated arms 41 and 43 are aligned, providing bracing which facilitates taking up the stresses on the disk and locking of the closed position.

The second embodiment of the module according to the invention, represented in FIGS. 5 to 7, has the advantage that the cross section of the fluid flow of the pipe sections is completely free, which makes possible scraping of the pipelines using a plunger element moving through the pipelines, pushed by a gas or liquid, in order to empty out the fluid carried in the mobile pipeline.

The two embodiments of the invention have the shared advantage that the space between the two disks, in their closed position, is practically zero, so that during emergency disconnection, after closing of the disks as seen in FIG. 4, there is no fluid which could enter the environment. Consequently, the risk of contaminating the environment is excluded. Thus, the module according to the invention is particularly suitable for transfer of any fluid which is harmful to the environment, such as, for example, liquefied natural gas. Another advantage of the invention lies in the light weight of the module. Yet another advantage of the invention lies in the fact that the disks, in their open position, are supported and immobilized, which prevents any vibration or flutter possibly induced by instabilities of the fluid flow. In the case of the first embodiment, the disks are flattened against one another in their open position, as seen in FIG. 3. In the second embodiment, the disks are flattened against a zone of abutment of the pipe sections.

Numerous modifications can of course be made to the embodiments described and represented. Thus, it would be possible, in the context of the second embodiment, to place the axes of articulation of the disks in a diametrically opposed manner.

What is claimed is:

1. An arrangement for connection and disconnection of two pipe sections of a fluid transfer system, each pipe section comprising an end element of a pipeline and a butterfly valve employing a disk pivoting inside the pipe section, around a pivot axis, between a closed position closing the pipe section against fluid flow and an open position opening the pipe section to the fluid flow, the pivot axes of the butterfly valves extending perpendicular to the axes of the respective pipelines and parallel to each other, the pivot axes being off center with respect to the axes of the respective pipelines, thereby reducing space between the disks in their closed position when the pipelines are connected to each other.

2. The arrangement according to claim 1, wherein the pivot axes are offset perpendicular to the axes of the pipelines, symmetrically with respect to the axes.

3. The arrangement according to claim 2, wherein the space between the disks is approximately zero when the disks are in the closed position.

4. The arrangement according to claim 3, wherein the disks butt against one another in the open position preventing kinematic play and vibrations or flutter of the disks induced by instabilities of the fluid flow.

5. The arrangement according to claim 2, including respective shafts defining the pivot axes of the disks, the shafts being fixedly mounted on rear surfaces of the disks.

6. The arrangement according to claim 1, wherein pivot axes of the disks lie outside the cross section of the fluid flow in the pipelines in which the disks are pivotably mounted.

7. The arrangement according to claim 6, including respective tabs attached at peripheries of the disks, wherein the pivot axes are located in free ends of the tabs.

8. The arrangement according to claim 6, including a device with articulated arms associated with the disks, a free end of a first of the arms being articulated to one of the disks, and a free end of a second of the arm being articulated at a wall of the pipeline.

9. The arrangement according to claim 7, wherein the pipelines have lateral protuberances for housing the articulated arms in the open position.

10. The arrangement according to claim 8, wherein the articulated arms are in a braced position when the disks are in the closed position.

* * * * *